(12) United States Patent
Moon et al.

(10) Patent No.: US 8,259,918 B2
(45) Date of Patent: Sep. 4, 2012

(54) METHOD AND SYSTEM FOR PLACING A COMMUNICATION SESSION ON HOLD

(75) Inventors: Dewayne Moon, Sachse, TX (US);
Mark A. Nicholson, Princeton, TX (US); Daniel J. Walls, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 598 days.

(21) Appl. No.: 12/480,915

(22) Filed: Jun. 9, 2009

(65) Prior Publication Data

US 2010/0310063 A1 Dec. 9, 2010

(51) Int. Cl.
*H04M 3/42* (2006.01)

(52) U.S. Cl. .................. 379/201.02; 379/207.1

(58) Field of Classification Search ............. 379/201.02, 379/207.03, 207.1
See application file for complete search history.

(56) References Cited

U.S. PATENT DOCUMENTS

| | | | |
|---|---|---|---|
| 6,400,804 B1* | 6/2002 | Bilder | 379/76 |
| 6,763,090 B2* | 7/2004 | Che et al. | 379/88.04 |
| 2002/0146106 A1* | 10/2002 | Himmel et al. | 379/215.01 |
| 2008/0101566 A1* | 5/2008 | Medved et al. | 379/93.25 |
| 2010/0239078 A1* | 9/2010 | Sweeney et al. | 379/101.01 |

* cited by examiner

*Primary Examiner* — Creighton Smith (57) ABSTRACT

An approach is provided for placing a real-time communication session (e.g., a voice call or a video call) on hold before the called party answers the call. After receiving a communication session request, the communication session is placed on hold until a predetermined time period expires, the called party answers the communication session, or the calling party elects to be directed to an answering service.

18 Claims, 11 Drawing Sheets

METHOD AND SYSTEM FOR PLACING A COMMUNICATION SESSION ON HOLD

BACKGROUND INFORMATION

Through the ubiquity of mobile devices, modern consumers have almost constant access to communication services at any time of the day. As a result, many users find themselves in situations where they may not be able to accept a call or otherwise respond to a communication request. For example, the user may be in an environment (e.g., a meeting, a noisy environment where hearing is difficult they support, etc.) or may be performing a task (e.g., driving, etc.) that prevents the user from immediately accepting the call or communication session. Generally, when faced with such a situation, a user may simply elect to not answer the call or to have the caller go to voice mail. However, there are times when the user would nonetheless like to take the call directly rather than miss the call.

In parallel, communications service providers are continually challenged to develop new services and features to remain competitive and to develop new sources of revenue.

Therefore, there is a need for an approach that provides for placing a communication session on hold before the called party answers the communication session or the communication is forwarded to an answering service and for notifying the calling party accordingly.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for placing a communication session on hold prior to answering the communication session are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile communication device, it is contemplated that these embodiments have applicability to any device capable of communicating over a network, such as a wireless cellular telephone, a home communication terminal (HCT), a digital home communication terminal (DHCT), landline connected to a Public Switched Telephone Network (PSTN), a personal digital assistant (PDA), a television, and/or a personal computer (PC), as well as other like technologies and customer premises equipment (CPE). As used herein, the term "communication session" refers to real-time forms of communications including voice calls and video calls between two or more participants using any communication device over a communication network.

Figure 1:
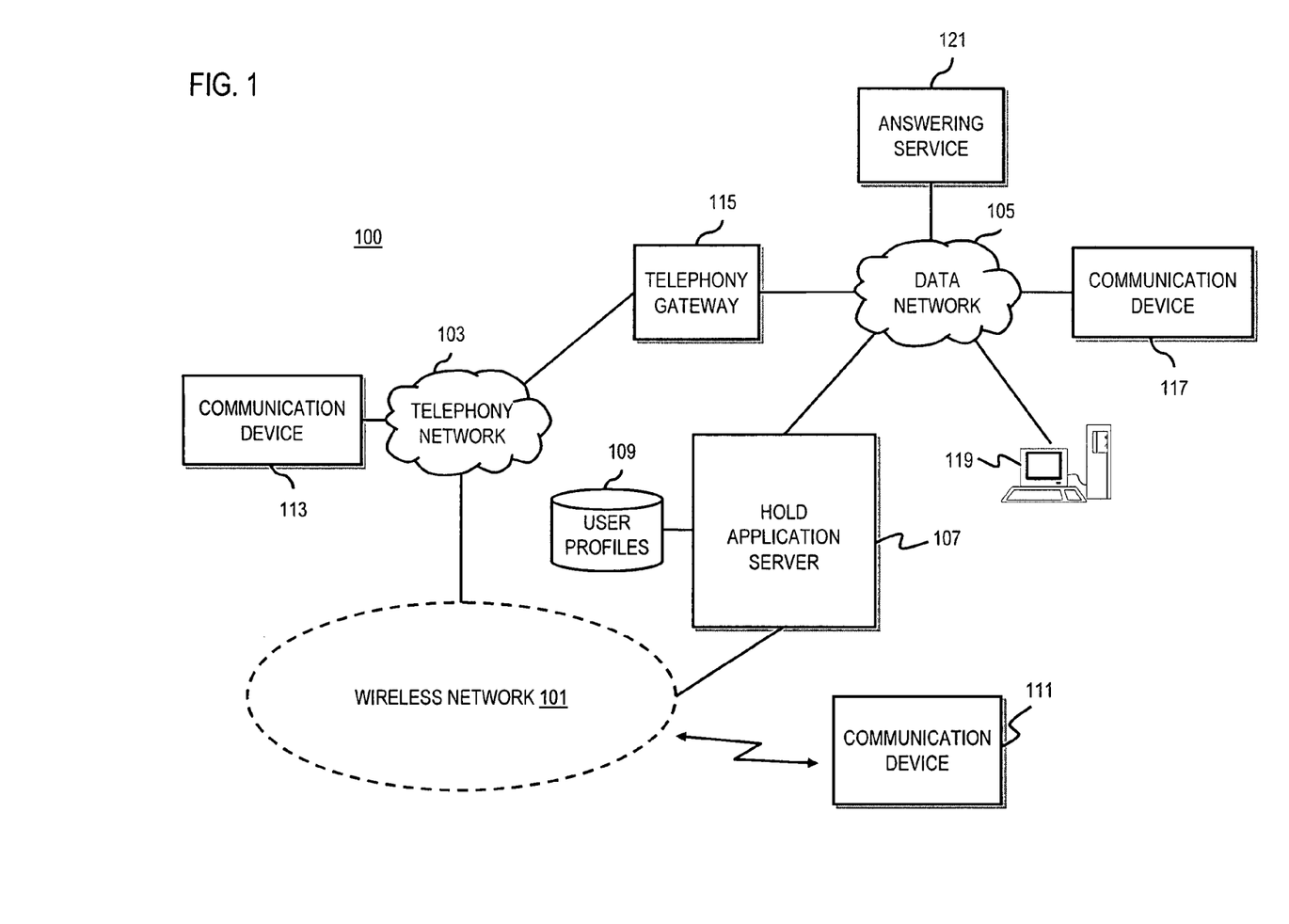
FIG. 1 is a diagram of a system capable of placing a communication session on hold, according to an exemplary embodiment.

FIG. 1 is a diagram of a system capable of placing a communication session on hold, according to an exemplary embodiment. For the purposes of illustration, a mechanism for placing a communication session on hold prior to answering the communication session is described with respect to a communication system 100 that includes a wireless network 101, a telephony network 103, and a data network 105. It is contemplated that the wireless network 101 may be, for example, a cellular network and may employ various technologies including, for example, code division multiple access (CDMA), enhanced data rates for global evolution (EDGE), general packet radio service (GPRS), global system for mobile communications (GSM), universal mobile telecommunications system (UMTS), etc., as well as any other suitable wireless medium, e.g., microwave access (WiMAX), Long Term Evolution (LTE) networks, wireless fidelity (WiFi), satellite, and the like. The telephony network 103 may include a public switched telephone network (PSTN) or equivalent. It is also contemplated the data network 103 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In exemplary embodiments, the system 100 supports a variety of communications (e.g., voice, video, text message, E-mail, instant messaging, etc.) conducted on any device capable of communicating over the communication networks (e.g., wireless network 101, telephony network 103, and data network 105) of the system 100.

The system 100 includes a hold application server 107 that resides on the network for placing a communication session on hold prior to answering the communication session. In addition (or alternatively), the hold application server 107 may reside in a telephony switch (not shown), customer premises equipment (CPE) (not shown), an Internet protocol multimedia subsystem (IMS) (not shown), or a mobile switching network (not shown). In exemplary embodiments, the hold application server 107 provides a pre-answer call-on-hold feature to enable a called party to place an incoming call (e.g., a voice call, a video call, etc.) on hold before the called party answers the call or the call is transferred to an answering service such as a voicemail server. In other words, by using the pre-answer call-on-hold feature, a called party may place the calling party on hold to allow the called party more time to answer the call without missing the call or sending the call to voicemail. The calling party is also notified of the pre-answer hold to, for instance, alert the calling party that the called party is available and intends to answer shortly. As discussed above, a user may receive a call when the environment or circumstances are not conducive to or do not permit the user to immediately answer a call (e.g., the called party is not in a private location to take the call, the called party is in the middle of a task, etc.). However, if the user is given more time to answer (e.g., by placing the incoming call on pre-answer hold), the user may be able to change the environment or circumstances, for instance, by changing locations or completing the task, to permit the user to answer the call within a short amount of time. In this way, the user can avoid missing the call or sending the caller to voicemail.

For example, a user is in a business meeting, but is expecting an important call. The user receives the call while in the meeting and places the call on pre-answer hold to allow time for the user to exit the meeting and answer the call. At the same time, the caller receives notification that the call has been placed on pre-answer hold. This notification provides feedback to the caller that user plans to answer the call. The alternate option of answering the call while in the meeting and asking the caller to wait is not ideal because answering the call during the meeting would (1) disrupt the meeting, and (2) possibly allow the caller to hear background conversations or background noises of the meeting. Similarly, the option of not answering the call is not ideal because the caller may not leave a message or the caller may require an immediate response. A third option of extending the ringing to allow more time for the user to respond is not ideal because this option does not provide feedback to the caller than the user intends to answer. As a result, the extended ringing might lead the caller to believe that the user is available to take the call.

In another example, a user is driving a car and receives a call from a client that the user has been expecting all day. The user places the call on pre-answer hold to provide time to pull over and stop before taking the call, and the caller is automatically notified of the pre-answer hold. In this way, the user can refer to client's documents and files in the user's briefcase during the call.

As seen in FIG. 1, the hold application server 107 has access to a database 109 of user profiles for specifying parameters to control the functions of the hold application server 107 on a user-by-user basis. For example, the user profile database 109 specifies the conditions for placing a communication session on pre-answer hold. The conditions, for instance, include an activation status of the pre-answer call-on-hold feature (e.g., whether the user has activated the feature, whether the feature applies automatically to incoming calls or is invoked manually or a per call basis), a predetermined time period for how long to place the communication on hold (e.g., 30 seconds, 60 seconds, etc.), identity of the calling device (e.g., invoking the pre-answer hold only for calls from a predetermined set of telephone numbers), time-of-day (e.g., activate the pre-answer call-on-hold feature only at specific times), or a combination thereof.

The hold application server also has connectivity to a variety of communication devices such as a communication device 111 (e.g., a mobile device) over the wireless network 101 via a cellular gateway (not shown), a communication device 113 (e.g., a voice station for initiating a voice call to other end terminals capable of supporting the voice call) over the telephony network 103 via a telephony gateway 115, and a communication device 117 (e.g., Personal Digital Assistant (PDA), personal computer, laptop computer, etc.) over the data network 105. Each of the communication devices (e.g., communication device 111, communication device 113, and communication device 117) may originate or receive communications sessions that can be placed on pre-answer hold using the hold application server 107.

The data network 105 also permits a host 119 to access the functions and settings of the hold application server 107 via a graphical user interface (GUI) such as a browser application or any web-based application. In one embodiment, it is contemplated that a user can configure the services, functions and settings of the hold application server 107 using the host 119 via a web browser.

In addition, the hold application server 107 has connectivity to an answering service 121 (e.g., a voicemail server). In certain embodiments, the hold application server 107 forwards communications sessions to the answering service 121 if a call has been placed in pre-answer hold for more than a predetermined period of time or when directed by the calling party.

In one embodiment, the pre-answer call-on-hold feature is a managed service, whereby a service provider operates the hold application server 107 to serve one or more subscribers.

Figure 2:
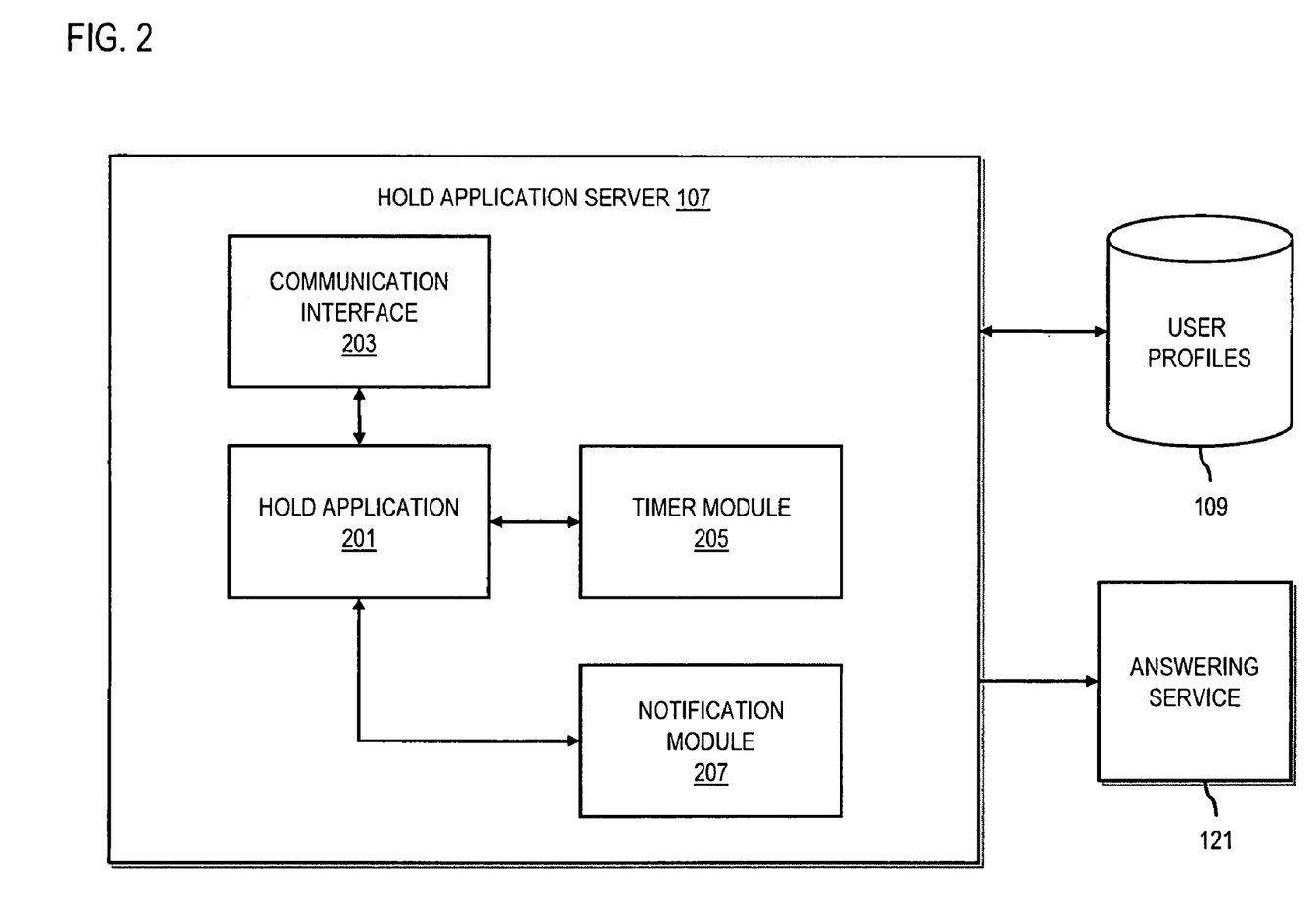
FIG. 2 is a diagram of the components of a hold application server, according to an exemplary embodiment.

FIG. 2 is a diagram of the components of a hold application server, according to an exemplary embodiment. By way of example, the hold application server 107 includes one or more components for placing a communication session on hold prior to answering the communication session and for notifying the calling party accordingly. It is contemplated that the functions of these components may be combined in one or more components or performed by other components of equivalent functionality. In one embodiment, the hold application server 107 includes the following components: a hold application 201, a communication interface 203, a timer module 205, and a notification module 207. The hold application server 107 also has connectivity to the user profiles database 109 and the answering service 121 (e.g., a voicemail server). As discussed previously, the user profiles stored in the database 109 can control the functions of the hold application server 107 on a per-user basis by specifying the activation status and other conditions for placing a communication session on pre-answer hold.

In exemplary embodiments, the hold application 201 within the hold application server 107 provides the control logic for directing the hold application server 107 to place a communication session on pre-answer hold and to notify both the calling party and the called party of the hold. For example, the hold application 201 interacts with the communication interface 203 to receive or detect a request to establish a real-time communication session between a calling party using a first communication device (e.g., communication device 111, 113, or 117) and a called party using a second communication device. The hold application 201 can then place the communication session on pre-answer hold according to, for instance, the user profile settings for the pre-answer call-on-hold feature associated with the called party using the second device. By way of example, the called party may configure the hold application server 107 (e.g., via a user profile) to automatically place incoming communication requests on pre-answer hold or to detect a manual command from the called party for placing the incoming communication session on pre-answer hold.

In one embodiment, the called party configures the pre-answer call-on-hold feature using any of the following methods: (1) a graphical user interface (GUI) run on the communication device itself or another device with connectivity to the hold application server 107 (e.g., host 119), (2) a service code (e.g., *XX) dialed from the communication device, or (3) a feature button located on the communication device. It is contemplated that the called party may use any method or mechanism to configure the pre-answer call-on hold feature. To manually place a communication session on pre-answer hold, the called party may also use any of the above methods (e.g., GUI, service code, or feature) to send a command to the hold application server 107 to place an incoming communication request on hold after receiving notification of the incoming communication (e.g., incoming call notified by ringing on the called party's communication device).

In certain embodiments, after placing the communication session on pre-answer hold, the hold application 201 directs the timer module 205 to begin counting down over a predetermined time period (e.g., 30 seconds, 60 seconds, etc.). The predetermined time period, for instance, prevents placing the communication session on an indefinite hold. For example, the predetermined time period is specified in the user profile and dictates how long the hold application 201 should maintain the communication session on hold before automatically forwarding the communication session to the answering service 121 (e.g., a voicemail server). Concurrent with placing the communication session on hold or shortly thereafter, the hold application 201 notifies both the calling party and the called party that the communication session has been placed on pre-answer hold via, for example, the notification module 207. In exemplary embodiments, the notification module 207 also notifies both the called party and the calling party of the predetermined time period and the time remaining before the time period expires. It is contemplated that the called party may configure the notification module 207 to either provide a default pre-answer hold notification message or create a custom notification that will be played to callers placed on pre-answer hold. If the called party does not answer within the predetermined time period, the hold application 201 will direct the communication session to the answering service 121. The calling party can also manually direct the hold application 201 by issuing a command (e.g., by pressing the # key, dialing a service code, or using a feature button) to forward the communication session immediately to the answering service at any time within the predetermined time period.

Figure 3A:
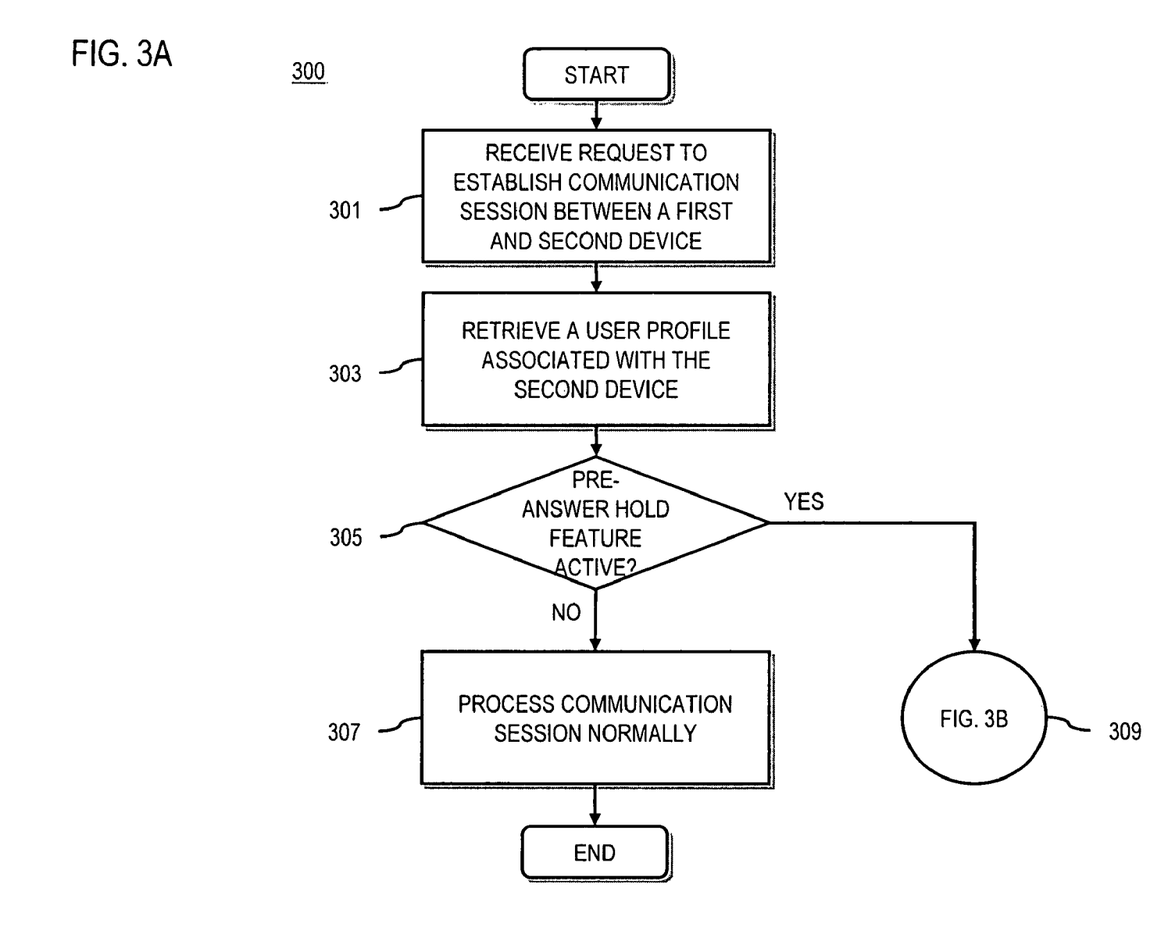
FIGS. 3A-3C are flowcharts of a process for placing a communication session on hold, according to an exemplary embodiment.
Figure 3B:
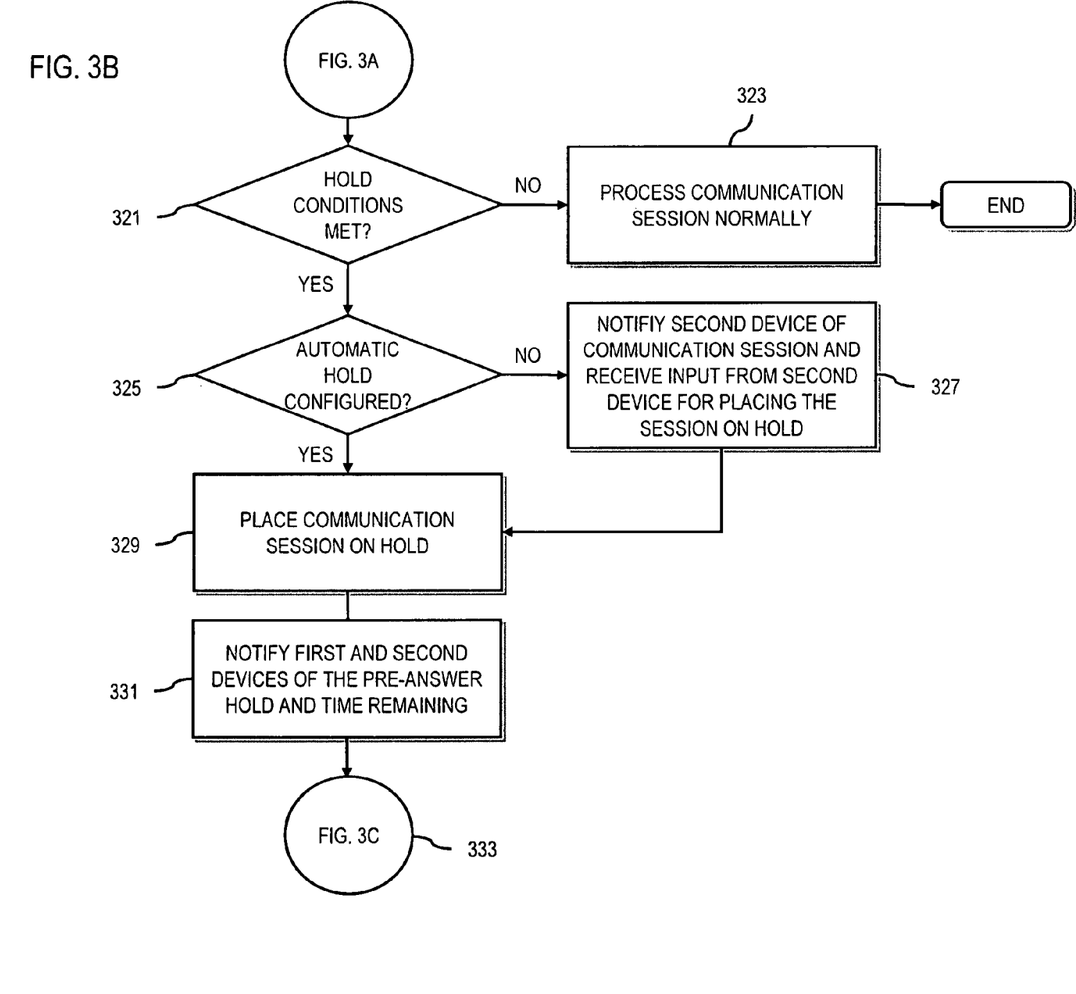
Figure 3C:
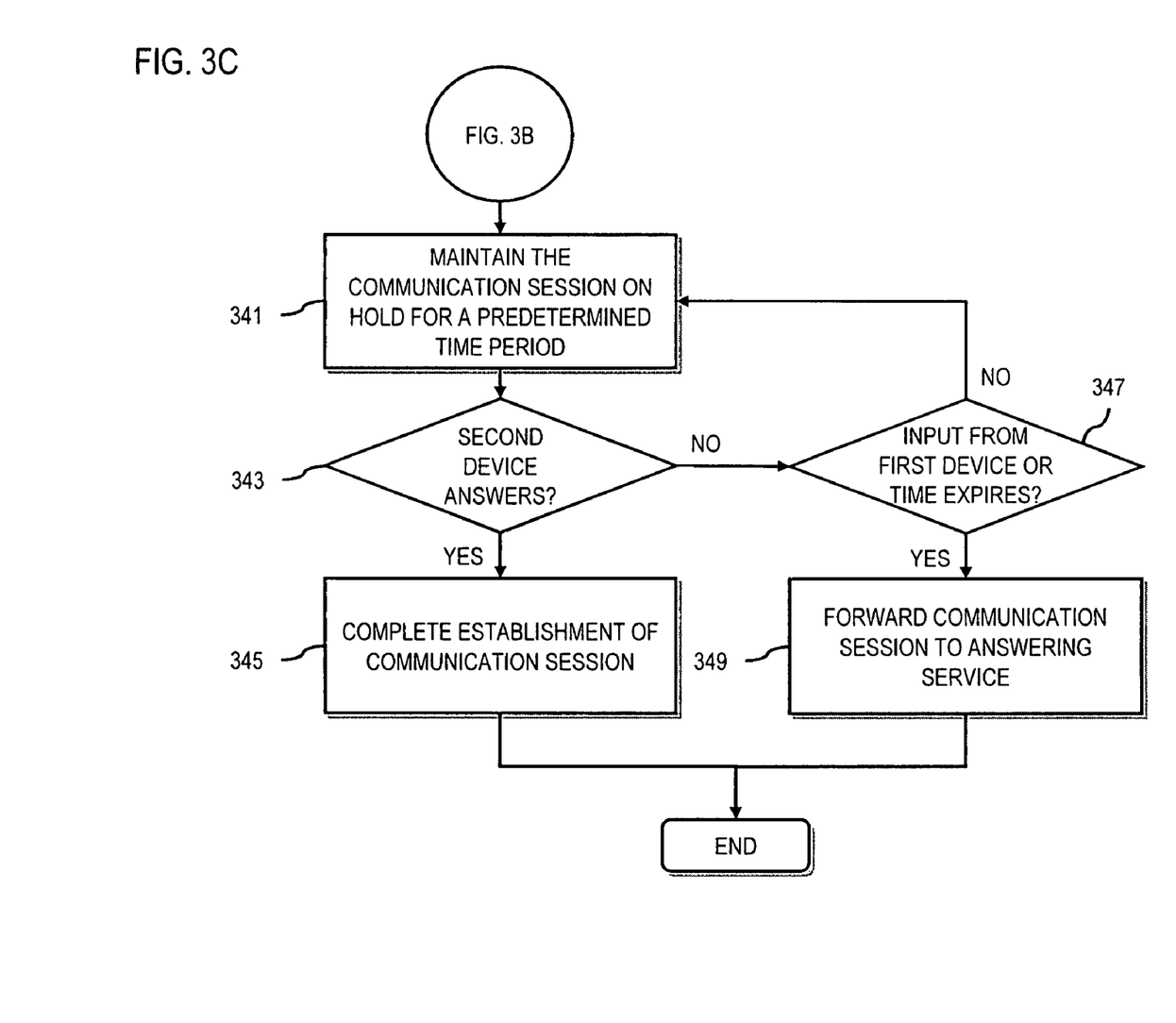

FIGS. 3A-3C are flowcharts of a process for placing a communication session on hold, according to an exemplary embodiment. In one embodiment, the hold application server 107 performs the process 300 of FIGS. 3A-3C. In step 301, the hold application server 107 receives a request to establish a real-time communication session between a first device (e.g., a calling party) and a second device (a called party). For example, the request may be signaled when the first device originates a call to the second device. In this case, the origination of the call constitutes the request. It is contemplated that the hold application server 107 may use any mechanism to detect the request to establish the communication session. After receiving the request, the hold application server 107 retrieves the user profile associated with the second device (e.g., the called device) (step 303) to determine whether the pre-answer call-on-hold feature is active on the second device (step 305). In exemplary embodiments, any communication device, including the second device, may be configured to activate the pre-answer call-on-hold feature at any time. Additionally, the feature may be activated or deactivated by either the user of the device or the service provider corresponding to the device. If the hold application server 107 determines that the feature is not active, the communication session is processed using the existing or normal calling procedures of the service provider (step 307). If the pre-answer call-on-hold feature is active, the hold application server 107 follows the steps depicted in FIG. 3B below (step 309).

FIG. 3B is a flowchart continuing the process 300 of FIG. 3A, according to one embodiment. Following determination that the second device (e.g., the called party) has configured the pre-answer call-on-hold feature to be active, the hold application server 107 determines whether the conditions for invoking the feature have been met (step 321). In exemplary embodiments, the conditions for invoking the pre-answer call-on-hold feature are specified in the user profiles of database 109. If the hold application server 107 determines that the hold conditions are not met for a particular communication session, the communication session is processed using the existing or normal calling procedures (step 323). The hold conditions include, for instance, the identity of the calling party (e.g., the first device) and time-of-day. For example, the called party may specify a list of telephone numbers or other like identifiers for which the pre-answer call-on-hold features apply. In this way, only specific contacts can be placed on pre-answer hold. Similarly, the called party may specify particular times of the day during which the pre-answer call-on-hold feature is active. For example, the feature may be active only during meetings as determined by a calendar stored on the communication device, or the feature may only be active during working hours. It is contemplated that the hold application server 107 may provide any other condition (e.g., location, anticipated calling volume, etc.) for invoking the feature.

If the hold conditions are met for the communication session, the hold application server 107 then determines whether the called party has the pre-answer call-on-hold configured to operate automatically or manually (step 325). By way of example, if the feature is configured to operate manually, the hold application server 107 notifies the called party of the incoming communication session (e.g., by ringing on the called party's communication device) and waiting to receive input for placing the communication session on pre-answer hold (step 327). Once the input is received to place the communication session on pre-answer hold or if the called party has configured the hold application server 107 to operate automatically, the hold application server 107 places the communication on pre-answer hold (step 329). As discussed previously, a pre-answer hold places the incoming communication session on hold even before the called party answers the communication session. In addition, the hold application server 107 notifies both the calling party (e.g., first device) and the called party (e.g., the second device) that the communication session has been placed on pre-answer hold (step 331). For example, the calling party may receive an announcement that "Your call has been placed on hold. Please hold or press # to be forwarded directly to voicemail." It is contemplated that the hold application server 107 may provide any form of notification to the calling and called parties. In addition, the notification may provide the predetermined amount of time the communication session will remain on hold before being automatically transferred to voicemail (e.g., the answering service 121) and the time remaining before the predetermined time period expires. In exemplary embodiments, the predetermined time period is specified in the user profile associated with the communication device of the called party. It is contemplated that the hold notification message may be transmitted using voice, video, instant message, E-mail, or any other form of communication supported by the first or second communication devices. The process then continues as depicted in FIG. 3C (step 333).

FIG. 3C is a flowchart continuing the process 300 of FIG. 3A, according to one embodiment. After placing the communication on pre-answer hold and notifying the calling and called parties, the hold application server 107 maintains the communication session on hold for the predetermined time period (step 341). During this time period, the hold application server 107 continues to monitor whether the second device (e.g., the called party) has answered the communication session (step 343). If the called party answers the communication session, the hold application server 107 completes the establishment of the communication session between the calling party and the called party (step 345). If there is no answer by the called party, the hold application server determines whether (1) the calling party has sent an input command to go directly voicemail, or (2) the predetermined time period has expired (step 347). If there is no input by the calling party and the time has not expired, the hold application server 107 returns to step 341 to maintain the communication session on hold. Otherwise, the hold application server 107 forwards the communication session to the answering service 121 to, for instance, enable the calling party to access the voicemail server (step 349).

The processes described herein for placing a communication session on hold may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 4:
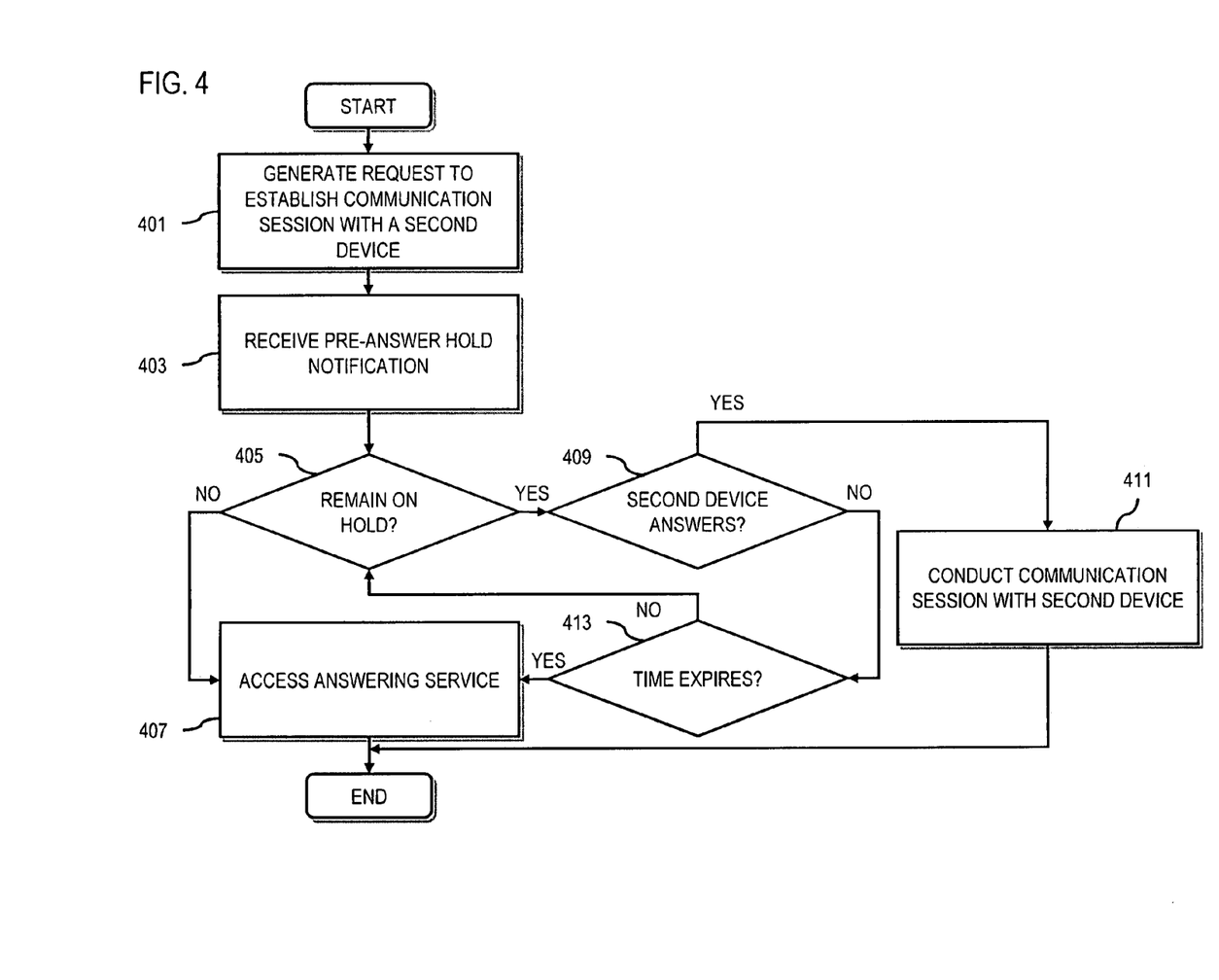
FIG. 4 is a flowchart of a process for responding to a communication session that has been placed on hold, according to an exemplary embodiment.

FIG. 4 is a flowchart of a process for responding to a communication session that has been placed on hold, according to an exemplary embodiment. The process 400 is described from the perspective of a calling party that has been placed on pre-answer hold. In step 401, the calling party generates a request to establish a communication session with a second device (e.g., the called party). For example, the calling party generates the request by originating the communication session to the called party (e.g., by dialing the called party's telephone number). In this example, the called party has activated the pre-answer call-on-hold feature, and the calling party receives a notification that the communication session has been placed on pre-answer hold (step 403). The notification may also include a time period that the communication session will remain on hold and provide an option for the calling party to go directly to the called party's voicemail as described with respect to FIG. 3.

On being placed on pre-answer hold and receiving the corresponding notification, the calling party determines whether to remain on pre-answer hold (step 405). If the calling party does not want to remain on hold, the calling party enters a command (e.g., a service code, feature button, or GUI) to direct the hold application server 107 to forward the communication session to the answering service 121 (step 407). If the calling party remains on hold, the party waits for the second device (e.g., the called party) to answer (step 409). If the second device answers, the calling party is connected to the second device to conduct the communication session (step 411). If the second device has not answered, the calling party waits for the predetermined time to expire (step 413). If the time has not expired, the calling party returns to step 405 to remain on hold. If the time expires, the calling party is automatically forwarded to the answering service 121 (as described with respect to step 407).

Figure 5:
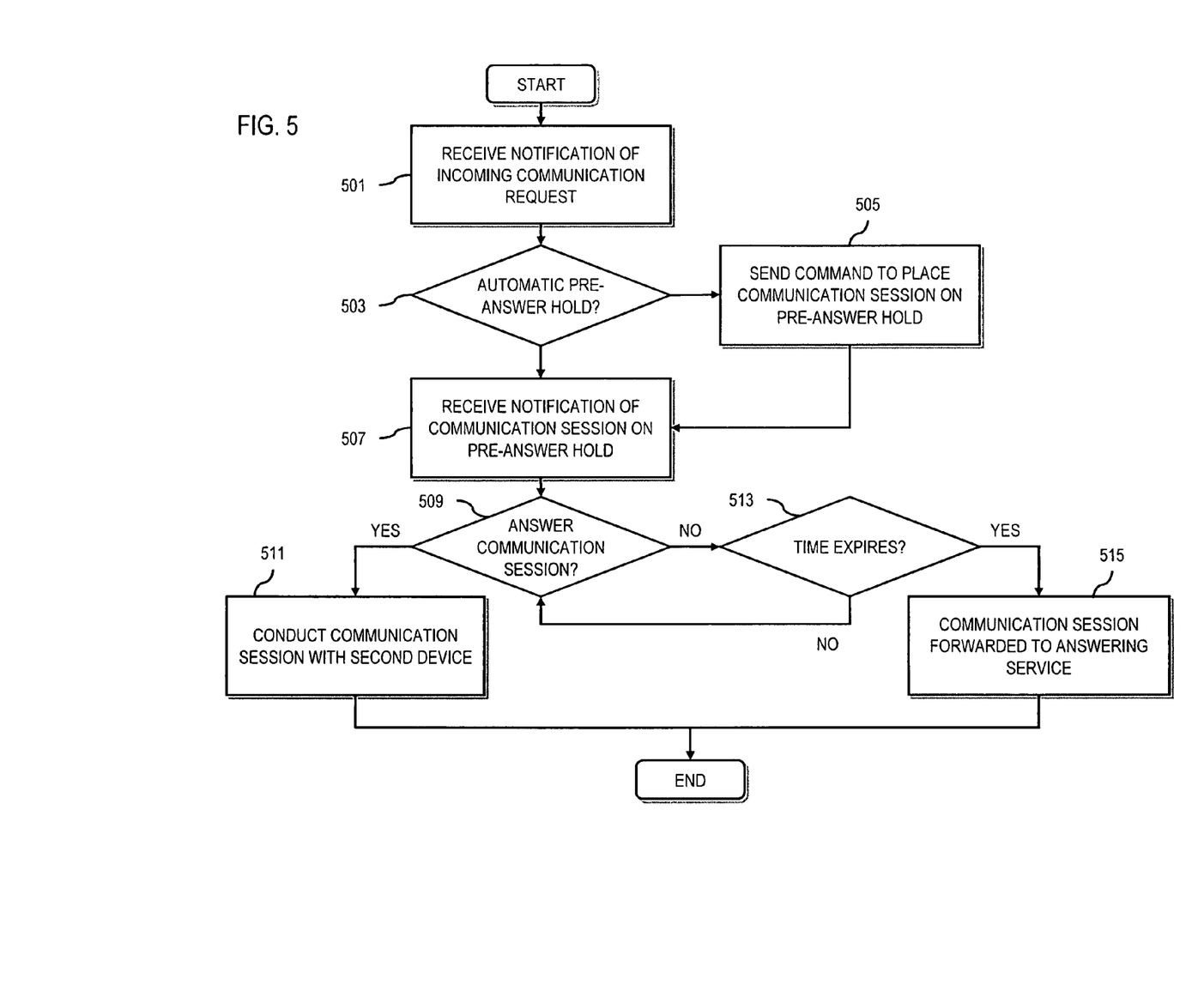
FIG. 5 is a flowchart of a process for placing a received communication session on hold, according to an exemplary embodiment.

FIG. 5 is a flowchart of a process for placing a received communication session on hold, according to an exemplary embodiment. The process 500 is described from the perspective of a called party that has placed an incoming communication session on pre-answer hold. In step 501, the called party receives a notification of an incoming communication request. For example, the notification may comprise ringing on the called party's communication device. In other embodiments, the notification may be a text message appearing on the user communication device or vibration. It is contemplated that the notification may be any form of alert to indicate an incoming communication request. If the called party has configured the pre-answer call-on-hold feature to operate manually as described with respect to FIG. 3 (step 503), the called party will continue to receive notification of the incoming communication request (e.g., ringing) until the called party sends a command to place the incoming communication session on pre-answer hold (step 505). In exemplary embodiments, the called party may send the command using, for instance, a GUI, a service code, or a feature button.

On sending the command or if the pre-answer call-on-hold feature is configured to operate automatically, the communication session is placed on pre-answer hold. The called party then receives notification that the communication session has been placed on hold (step 507). In certain embodiments, the notification includes a predetermined time period for maintaining the communication session on pre-answer hold and the time remaining before the time period expires. The called party may chose to answer the communication session any time within the predetermined time period (step 509). If the called party answers, the communication session is established between the calling party and the called party (step 511). If the called party has not answer and the predetermined time period has expired (step 513), the communication session is forwarded to the answering service 121 and the called party need not do anything further (step 515). If the predetermined time period has not expired, the called party returns to step 509 and continues to receive notification of the time period remaining, and the hold application server 107 continues to wait for an answer from the called party.

Figure 6A:
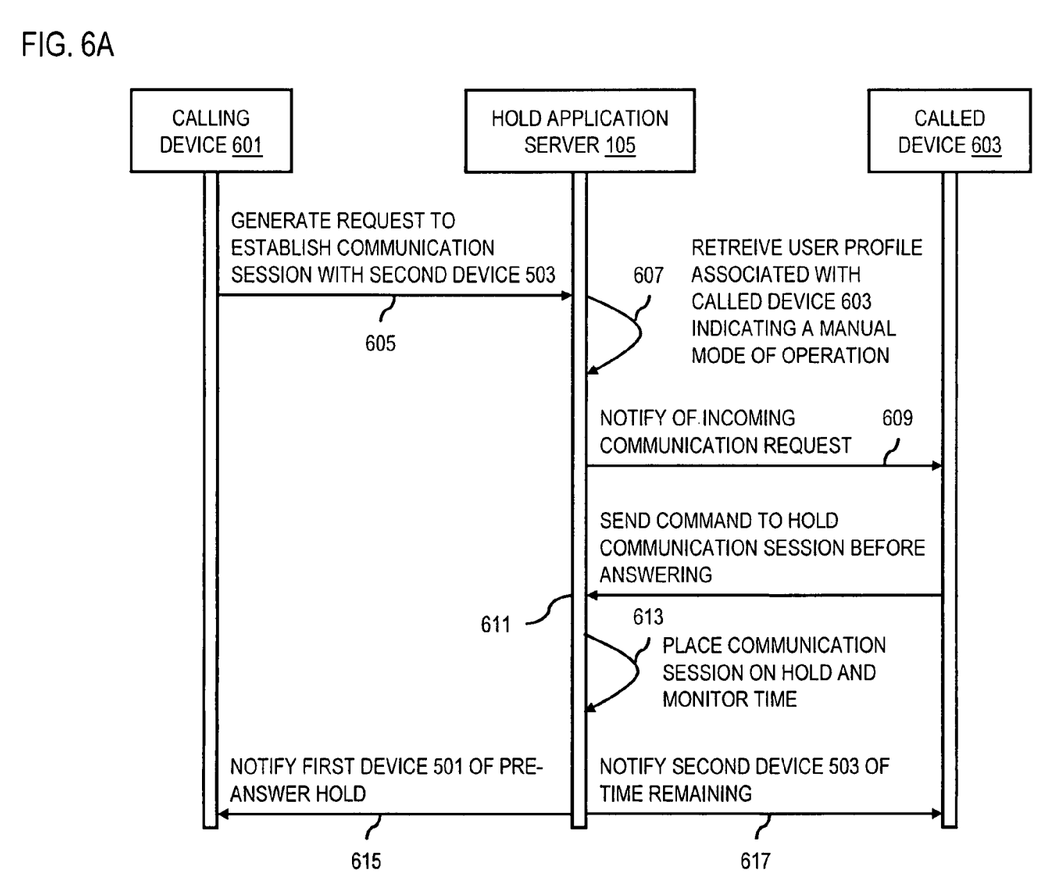
FIGS. 6A and 6B are time sequence diagrams that illustrate a sequence of messages and processes for placing a communication session on hold using a manual mode of operation, according to an exemplary embodiment.
Figure 6B:
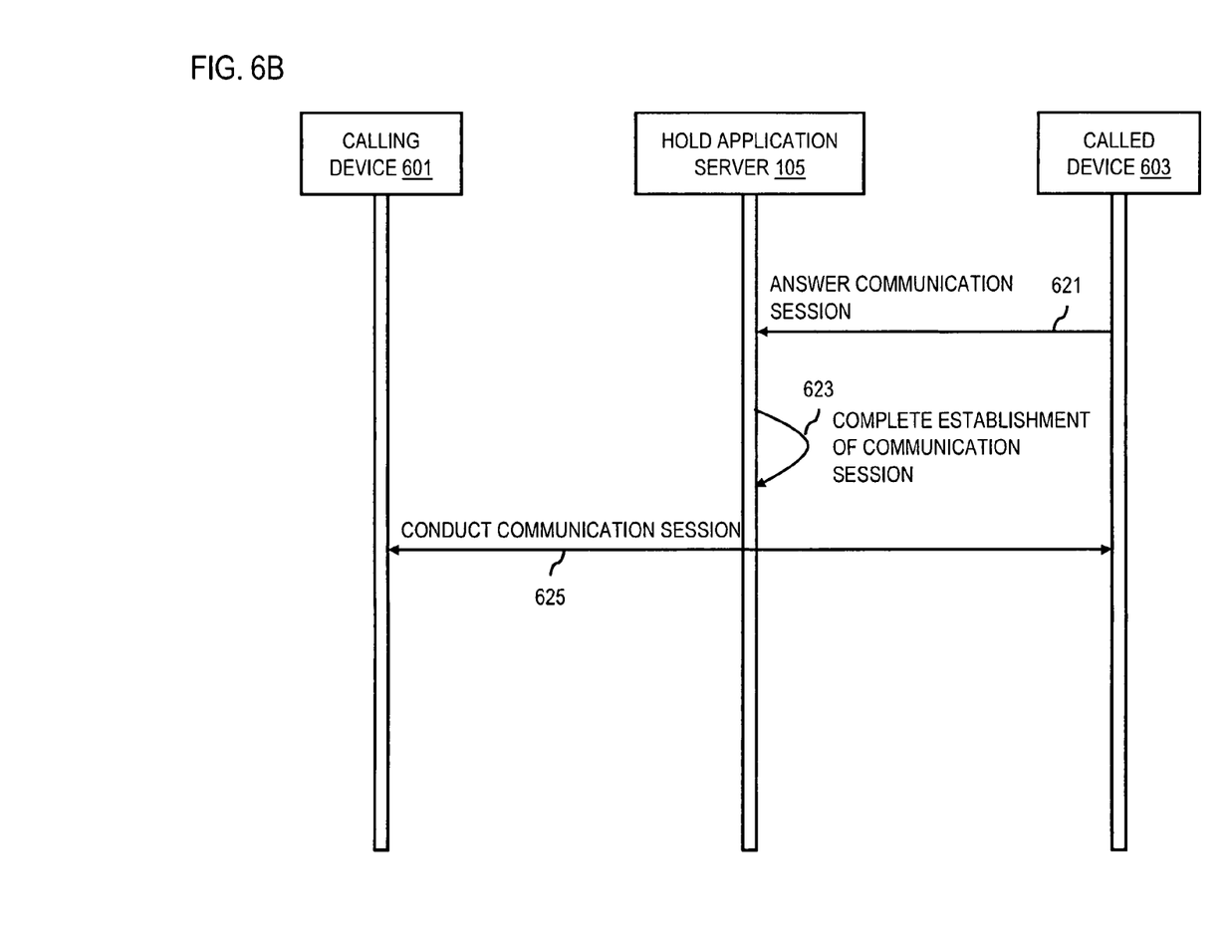

FIGS. 6A and 6B are time sequence diagrams that illustrate a sequence of messages and processes for placing a communication session on hold using a manual mode of operation, according to an exemplary embodiment. A process on the network is represented by a vertical box. A message passed from one process to another is represented by horizontal arrows. A step performed by a process is indicated by the text. The processes represented are a calling device 601 (e.g., a first communication device), the hold application server 107, and a called device 603 (e.g., a second communication device).

In step 605, the calling device 601 generates a request to establish a communication session with a called device 603. In exemplary embodiments, the communication session can be, for instance, a voice call or a video call. The request is received by the hold application server 107. In response, the hold application server 107 retrieves the user profile for the pre-answer call-on-hold feature associated with the called device 603 (step 607). In this example, the user profile instructs the hold application server 107 to act in a manual mode of operation. Accordingly, the hold application server 107 notifies the called device 603 of the incoming communication request and waits for a command from the called device 603 (step 609). As shown, the called device 603 sends a command to place the communication session on pre-answer hold (step 611). The hold application server 107 places the communication session on pre-answer hold according to the command from the called device (step 613) and begins monitoring the time. In exemplary embodiments, the hold application server 107 maintains the communication session on hold for a predetermined period of time before forwarding the session to an answering service. At the same time, the hold application server 107 notifies the calling device 601 (step 615) and the called device 603 (step 617) that the communication session has been placed on pre-answer hold. As previously discussed, the notification may include the predetermined time for maintaining the communication session on hold and the time remaining before the predetermined time expires.

FIG. 6B continues the time sequence diagram of FIG. 6A, according to an exemplary embodiment. In step 621, the called device 603 answers the communication session within the predetermined time. The hold application server 107 detects the called device 603 has answered the communication session and completes establishment of the communication session between the calling device 601 and the called device 603 (step 623). The calling device 601 and the called device 603 then conduct the communication session (step 625).

Figure 7:
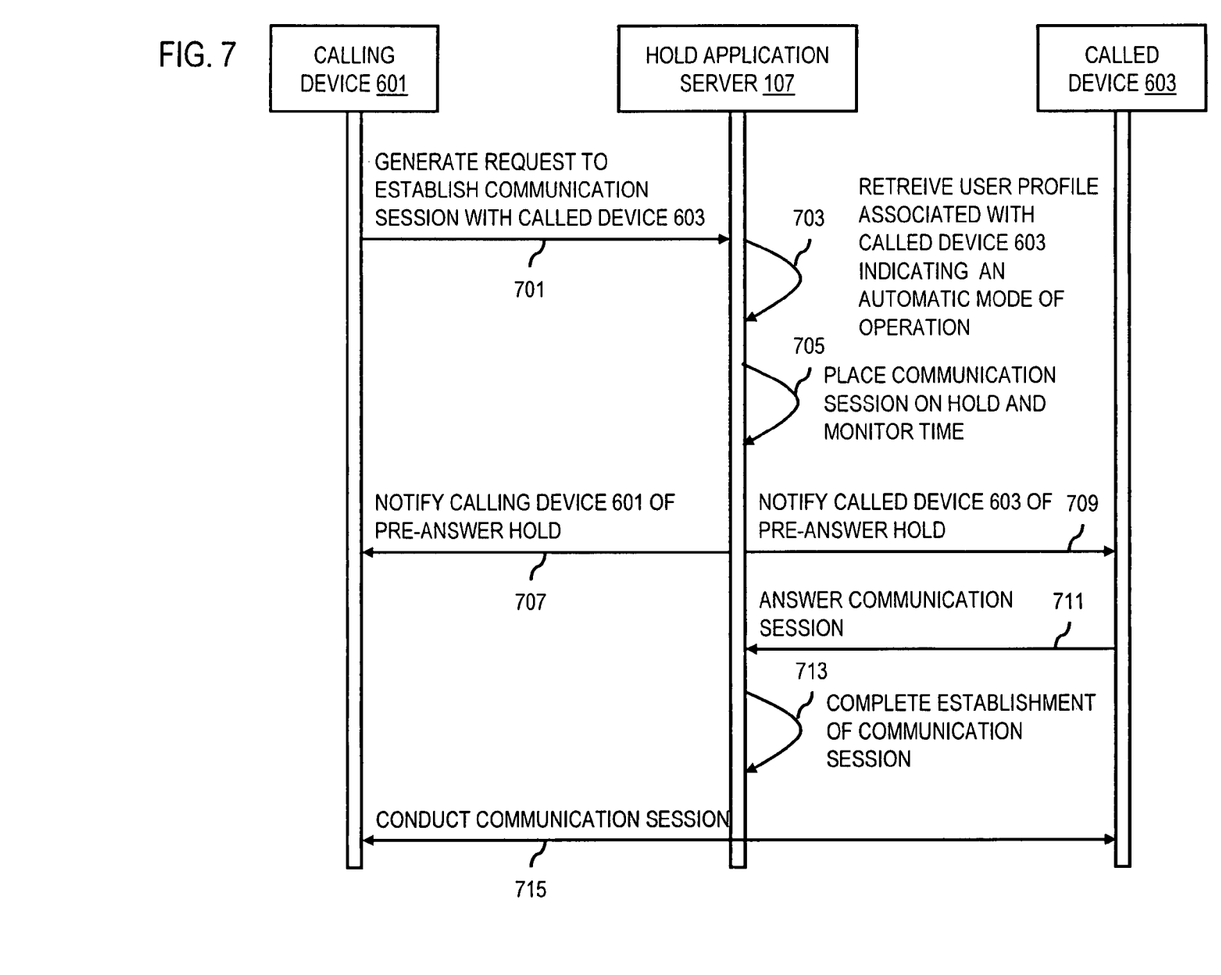
FIG. 7 is a time sequence diagram that illustrates a sequence of messages and processes for placing a communication session on hold using an automatic mode of operation, according to an exemplary embodiment.

FIG. 7 is a time sequence diagram that illustrates a sequence of messages and processes for placing a communication session on hold using an automatic mode of operation, according to an exemplary embodiment. As described with respect to FIGS. 6A and 6B, a process on the network is represented by a vertical box. A message passed from one process to another is represented by horizontal arrows. A step performed by a process is indicated by the text. The processes represented are identical to the processes represented in FIGS. 6A and 6B including a calling device 601 (e.g., a first communication device), the hold application server 107, and a called device 603 (e.g., a second communication device).

In step 701, the calling device 601 generates a request to establish a communication session with a called device 603. The request is received by the hold application server 107. In response, the hold application server 107 retrieves the user profile for the pre-answer call-on-hold feature associated with called device 603 (step 703). In this example, the user profile instructs the hold application server 107 to act in an automatic mode of operation. Accordingly, the hold application server 107 places the communication session on pre-answer hold without direct intervention from the user (step 705).

The subsequent steps are identical to those described for the manual mode of operation in FIGS. 6A and 6B. For example, the hold application server 107 maintains the communication session on hold for a predetermined period of time before forwarding the session to an answering service. At the same time, the hold application server 107 notifies the calling device 601 (step 707) and the called device 603 (step 709) that the communication session has been placed on pre-answer hold. In step 711, the called device 603 answers the communication session within the predetermined time. The hold application server 107 detects the called device 603 has answered the communication session and completes establishment of the communication session between the calling device 601 and the called device 603 (step 713). The calling device 601 and the called device 603 then conduct the communication session (step 715).

Figure 8:
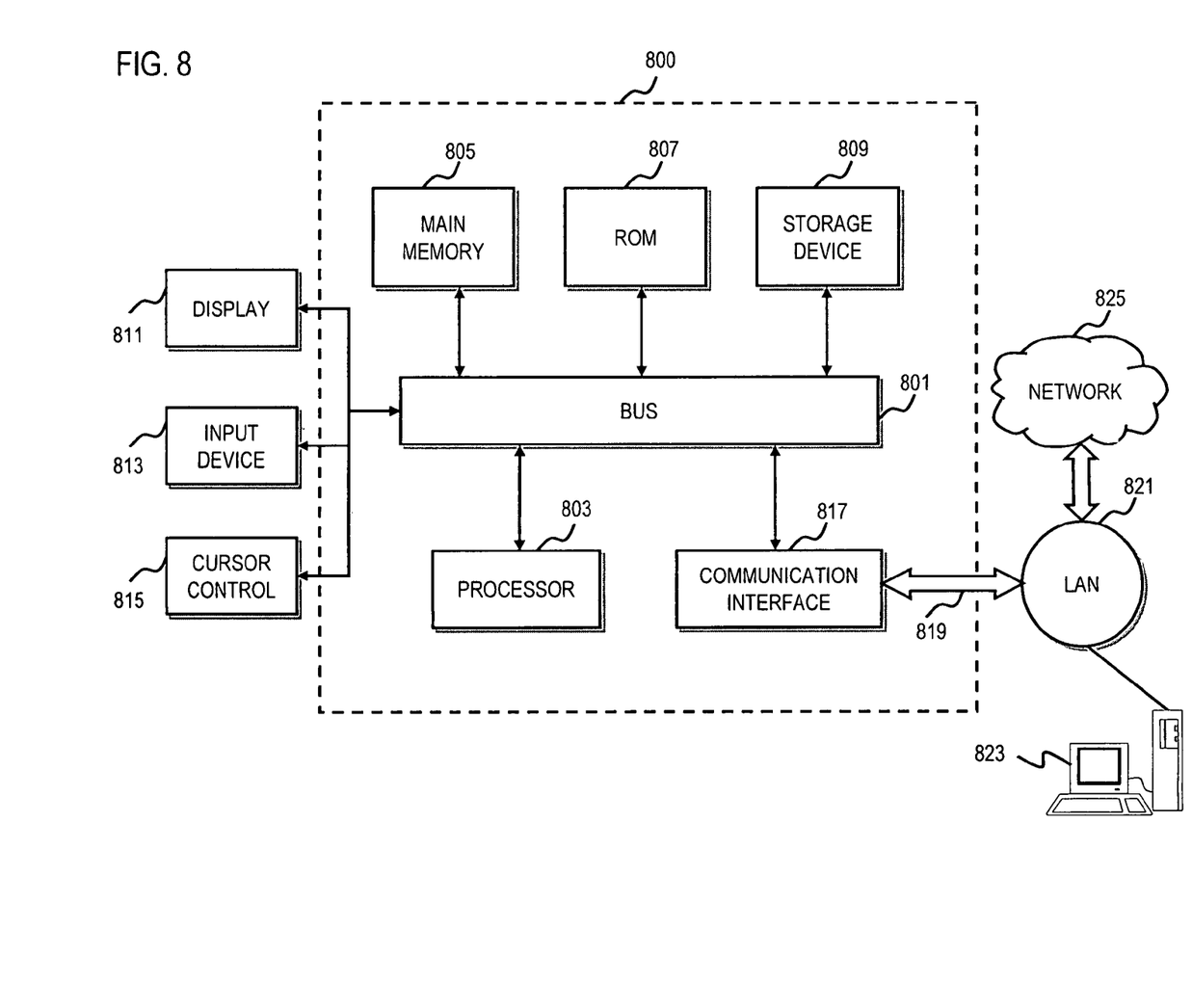
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving a request to establish a real-time communication session between a first device and a second device;
    placing the communication session on hold prior to answering the communication session by the second device; and
    retrieving a user profile associated with the second device, wherein the communication session is placed on hold according to the user profile.

2. A method of claim 1, wherein the user profile specifies conditions for placing a communication session on hold including an activation status of a feature for placing a communication session on hold, a predetermined time period for maintaining the communication session on hold, identity of the first device, time-of-day, or a combination thereof.

3. A method of claim 1, further comprising:
    receiving an input from the first device to enter an answering service; and
    forwarding the communication session to the answering service based on the input.

4. A method of claim 1, wherein the communication session is a voice call or a video call.

5. A method comprising:
    receiving a request to establish a real-time communication session between a first device and a second device;
    placing the communication session on hold prior to answering the communication session by the second device;
    maintaining the communication session on hold for a predetermined time period;
    determining a time remaining of the predetermined time period; and
    notifying the first device and the second device of the hold, the predetermined time period, the time remaining, or a combination thereof.

6. An apparatus comprising:
    a communication interface to receive a request to establish a real-time communication session between a first device and a second device;
    a processor configured to place the communication session on hold prior to answering the communication session by the second device; and
    a processor configured to retrieve a user profile associated with the second device,
    wherein the communication session is placed on hold according to the user profile.

7. An apparatus of claim 6, wherein the user profile specifies conditions for placing a communication session on hold including an activation status of a feature for placing a communication session on hold, a predetermined time period for maintaining the communication session on hold, identity of the first device, time-of-day, or a combination thereof.

8. An apparatus of claim 6, further comprising:
    a communication interface configured to receive input from the first device to enter an answering service; and
    a processor configured to forward the communication session to the answering service based on the input.

9. An apparatus of claim 6, wherein the communication session is a voice call or a video call.

10. An apparatus comprising:
    a communication interface to receive a request to establish a real-time communication session between a first device and a second device;
    a processor configured to place the communication session on hold prior to answering the communication session by the second device:
    a processor configured to maintain the communication session on hold for a predetermined time period and to determine the time remaining of the predetermined time period; and a communication interface configured to notify the first device and the second device of the hold, the predetermined time period, the time remaining, or a combination thereof.

11. An apparatus comprising:
a communication interface to receive a request to establish a real-time communication session between a first device and a second device;
a processor configured to place the communication session on hold prior to answering the communication session by the second device; and
a processor configured to determine whether the second device answers the communication session within a predetermined time period, to complete the establishment of the communication session based on a determination that the second device has answered the communication session within the predetermined time period, and to forward the communication session to an answering service based on a determination that the second device has not answered the communication session within the predetermined time period.

12. A system comprising:
a gateway configured to communicate over a communication network that serves a plurality of communication devices; and
an application server coupled to the gateway and configured to receive a request to establish a real-time communication session between a first device and a second device and place the communication session on hold prior to answering the communication session by the second device,
wherein the communication session is placed on hold according to a user profile associated with the second device.

13. A system of claim 12, wherein the user profile specifies conditions for placing a communication session on hold including an activation status of a feature for placing a communication session on hold, a predetermined time period for maintaining the communication session on hold, identity of the first device, time-of-day, or a combination thereof.

14. A system of claim 12, wherein the application server is further configured to receive an input from the first device to enter an answering service and to forward the communication session to the answering service based on the input.

15. A system of claim 12, wherein the communication session is a voice call or a video call.

16. A system comprising;
a gateway configured to communicate over a communication network that serves a plurality of communication devices; and
an application server coupled to the gateway and configured to receive a request to establish a real-time communication session between a first device and a second device and place the communication session on hold prior to answering the communication session by the second device,
wherein the application server is further configured to maintain the communication session on hold for a predetermined time period, to determine a time remaining of the predetermined time period, and to notify the first device and the second device of the hold, the predetermined time period, the time remaining, or a combination thereof.

17. A system comprising:
a gateway configured to communicate over a communication network that serves a plurality of communication devices; and
an application server coupled to the gateway and configured to receive a request to establish a real-time communication session between a first device and a second device and place the communication session on hold prior to answering the communication session by the second device,
wherein the application server is further configured to determine whether the second device answers the communication session within a predetermined time period, to complete the establishment of the communication session based on a determination that the second device has answered the communication session within the predetermined time period, and to forward the communication session to an answering service based on a determination that the second device has not answered the communication session within the predetermined time period.

18. A method comprising:
receiving a request to establish a real-time communication session between a first device and a second device;
placing the communication session on hold prior to answering the communication session by the second device;
determining whether the second device answers the communication session within a predetermined time period;
completing the establishment of the communication session based on a determination that the second device has answered the communication session within the predetermined time period; and
forwarding the communication session to an answering service based on a determination that the second device has not answered the communication session within the predetermined time period.

* * * * *